United States Patent [19]

Kinsley

[11] Patent Number: 4,563,927
[45] Date of Patent: Jan. 14, 1986

[54] TUBE CUT-OFF APPARATUS
[75] Inventor: Robert J. Kinsley, Elmhurst, Ill.
[73] Assignee: Vogel Tool & Die, Stone Park, Ill.
[21] Appl. No.: 648,612
[22] Filed: Sep. 7, 1984

Related U.S. Application Data

[63] Continuation of Ser. No. 427,715, Sep. 29, 1982, abandoned.

[51] Int. Cl.$^4$ .................. B23D 21/00; B23D 25/04
[52] U.S. Cl. .............................. 83/319; 83/385; 83/555; 83/454
[58] Field of Search .................... 83/318–320, 83/54, 385, 294, 454, 300, 519, 555, 698–700

[56] References Cited

U.S. PATENT DOCUMENTS

| | | | |
|---|---|---|---|
| 2,741,309 | 4/1956 | Czarnik | 83/300 |
| 2,879,844 | 3/1959 | Tuttle | 83/214 |
| 3,129,624 | 4/1964 | Auer | 83/300 |
| 4,015,496 | 4/1977 | Hill | 83/555 |
| 4,036,091 | 7/1977 | Borzym | 83/700 |
| 4,055,100 | 10/1977 | Borzym | 83/454 |
| 4,108,029 | 8/1978 | Borzym | 83/54 |
| 4,337,680 | 7/1982 | Borzym | 83/319 |
| 4,392,644 | 7/1983 | Borzym | 83/456 |

Primary Examiner—James M. Meister
Assistant Examiner—John L. Knoble
Attorney, Agent, or Firm—Richard J. Myers

[57] ABSTRACT

A tube cut-off apparatus includes a horizontally moving scarfing blade which opens up the top of a tube permitting a vertical moving cut-off blade to move through the opening and finish cutting the tube. An upper die plate supports the vertical cut-off blade and a locking cam arrangement includes spaced vertically extending cams which provide for longitudinal movement of clamping slides in turn opening and closing jaws of die blocks which support the tube to be cut. A horizontally movable slide member carries a scarfing blade which cuts horizontally the upper tube portion and moves out of the way to permit the vertical blade to shear through the tube. The scarfing and clamping arrangement is actuated entirely by the mechanism on one side of the apparatus with the cams performing the clamping function as well as the actuation of the slide member. The sliding blocks and associated clamping members are all supported on a T-shaped rail and the moving elements on the rail are confined and maintained in position by a retaining frame which surrounds the elements, the said frame having limited horizontal movement.

33 Claims, 11 Drawing Figures

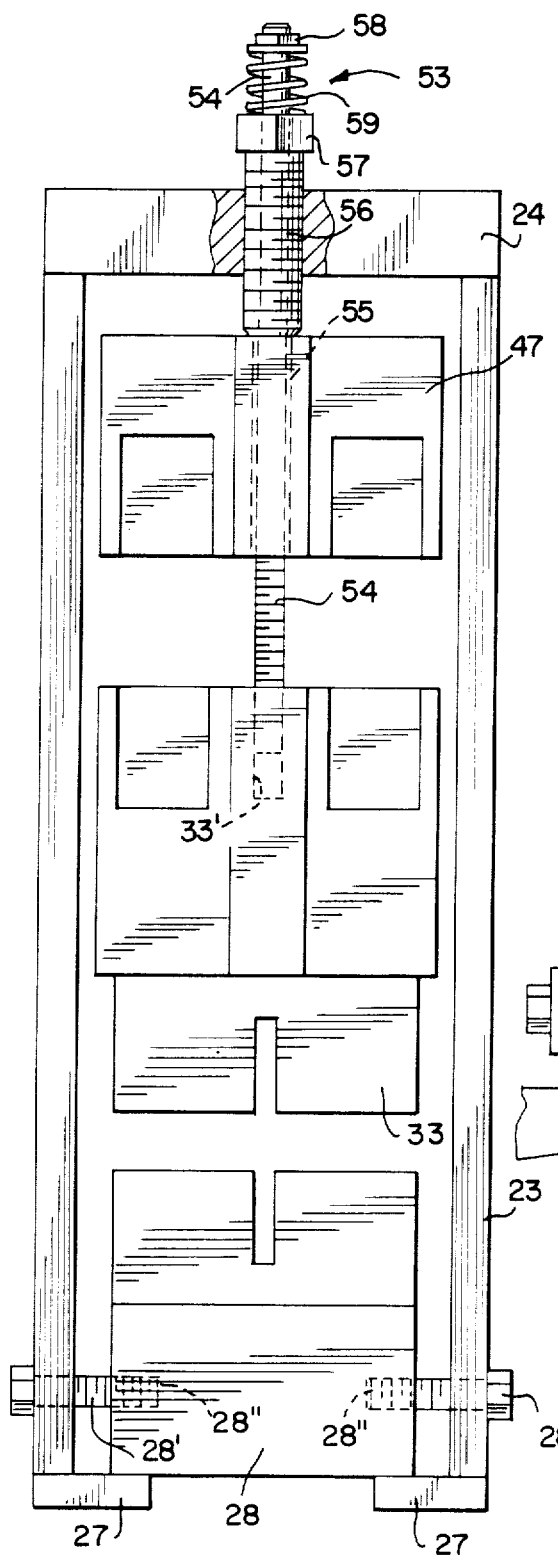
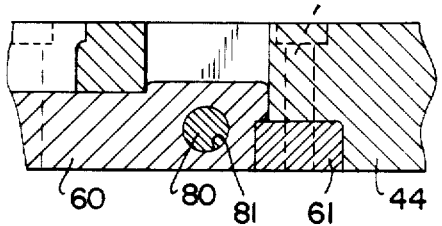
FIG. 9
FIG. 11
FIG. 10

TUBE CUT-OFF APPARATUS

This application is a continuation of application Ser. No. 427,715, filed Sept. 29, 1982, now abandoned.

BACKGROUND OF THE INVENTION

1. Field of Invention

This invention relates to a tube cut-off apparatus utilizing a horizontal moveable cutting blade to scarf an opening in the top of a tube, and then actuating a vertically movable cutting blade to sever the tube.

2. Description of the Prior Art

The prior art is exemplified in patents to: Czarnick U.S. Pat No. 2,741,309; Tuttle U.S. Pat. No. 2,879,844; Borzym U.S. Pat. No. Re. 22,114; Aver U.S. Pat. No. 3,129,624; Borzym U.S. Pat. Nos. Re. 30,025, 4,108,029 and Hill U.S. Pat. No. 4,015,496. These all disclose the principle of scarfing the opening in the top of a tube and thereafter severing the tube with a vertical blade. By this method of operation the tube ends thus severed are free of dimpling which would otherwise occur with the utilization of a single severing blade. The present invention utilizes the old principles disclosed in the prior art and discloses an improved apparatus which is ideally suited for use in tube mill operations wherein the die is moved rapidly with the tube as it is formed in the mill and is immediately severed by the die, after which the operation is repeated. This type of cutt-off die apparatus is frequently referred to in the art as a "flying" cut-off.

SUMMARY OF THE INVENTION

The present invention is in a novel tube cutting apparatus which utilizes the principles of the prior art, namely the severing of a tube without dimpling the wall of the tube in that a scarfing blade is initially drawn across the upper wall of the tube creating an opening, or severed portion, which then receives the cutting end of a blade and slices through the tube. The invention pertains to the precise arrangement of the functional elements of the die which are supported on a bottom plate, or die shoe of the apparatus. An upper platen or upper die shoe supports a vertical cut-off blade which projects downwardly. A pair of vertical cams are supported on the upper platen and extend downwardly, one of the cams having a roller cam pivotally supported therein. The roller cam is in engagement with the upper end of a diagonal track which during downward movement of the cams causes movement of a slide in a horizontal direction. The slide has supported thereon a scarfing blade which is drawn across the upper chord of the tube for creating the initial opening. As the cams move down through the lower platen, the scarfing tool moves to an out of the way position, to the right of the tube, and the upper cutting blade then slices through the tube. During the downward movement of the cams and upper blade, the cams engage rollers supported on die blades which move longitudinally a slight distance to close the jaws of cut-off die blocks which instantly tightly grip the tubing in their relatively closed position. The lower platen on which the die blocks, jaws, etc. are mounted include a raised T-shaped rail on the top surface of the lower plate. The die blocks and clamping slides are undercut on their bottom surfaces to provide recesses to conform to the T-rail and thus are firmly fixed against lateral movement, but may have limited movement on the T-rail in a longitudinal direction. The invention further includes the provision of a retaining frame which surrounds the T-Rail and moves with the longitudinal movement of the elements which are supported on the T-rail in a limited fashion. One of the advantages of the invention lies in the positioning of the drive elements namely the clamping cam and slide propelling means on the same side, to the right of the vertical cut-off plate, this arrangement permitting use of the die in relatively smaller space limited presses. Further the invention includes the feature that the cams control the positioning of the die blocks, as well as moving them and scarfing blade between the desired positions. A primary feature of the present tube cut-off machine is the arrangement wherein the cam element, the horizontal slide, the blade holders, and the scarfing blade are in-line i.e. substantially horizontally aligned which provides a more accurate cutting arrangement and a more efficient operation with added tool life to the units of the apparatus. Side forces are eliminated, twisting action is reduced and efficiency is increased.

Further features of the invention include the fine adjustment of the depth of the scarfing cut which may be made in the tube by adjusting the carrier supporting the scarfing knife relative to the slide member.

Features of the invention include:

The clamping cams serve the dual function of clamping the tube and driving the horizontal slide which supports the scarfing blade.

Both the clamping action and horizontal blade movement are drawn from the same side, i.e. to the right of the vertical cutting blade.

All of the bearing housings and clamping slides ride on the T-shaped rail or guide member, with the housings apertured on their bottom sides to receive the T-rail configuration and thus accurately position the elements.

The clamping slides and bearing housings are held together on the T-rail by means of the retainer which includes the side rails connected to transverse extending end straps.

Another feature is that the bearing for driving the horizontal slide is located on one of the clamping cams.

A further feature includes a fine adjustment mechanism whereby the height of the horizontal scarfing blade can be adjusted relative to the tube edge.

Another feature is that the track for driving the horizontal slide is located in the slide itself and the bearing caps are used as side supports for the horizontal slide.

BRIEF DESCRIPTION OF THE DRAWINGS

FIG. 9 is a cross sectional view taken along the line 9—9 of FIG. 1.

FIG. 10 is a schematic view disclosing a sliding retaining frame and associated die structure in schematic form.

FIG. 11 is an end elevational view of the schematic disclosure of FIG. 10.

DESCRIPTION OF THE PREFERRED EMBODIMENT

Figure 1:
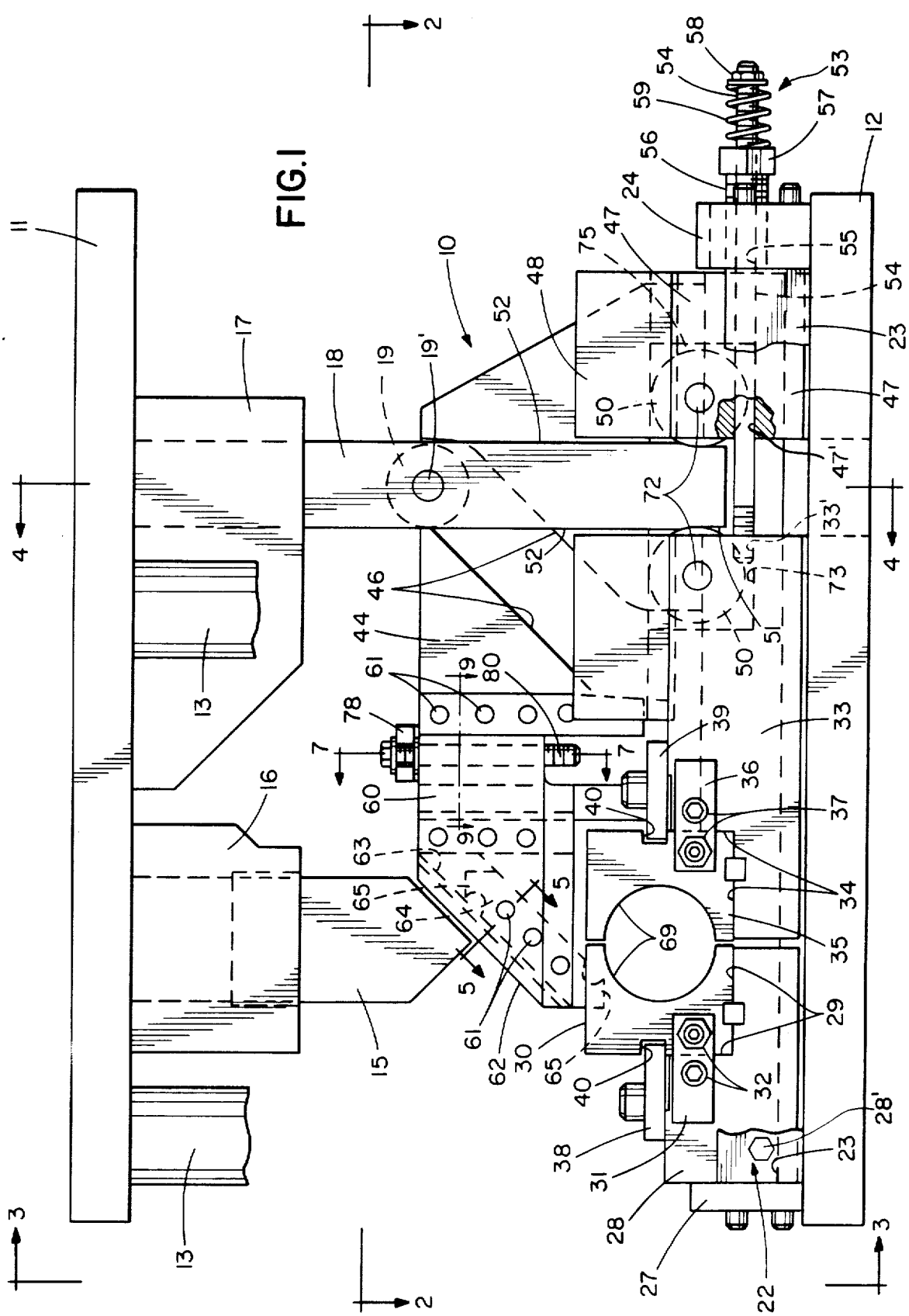
FIG. 1 is a side elevational view of the improved tube cut-off apparatus with a portion of a side strap of a retaining frame broken away to better illustrate the invention.

In the exemplary embodiment of the invention as disclosed in the drawings a tube cutting apparatus is referred to at 10. The apparatus 10 includes upper and lower die plates 11 and 12 also referred to as die shoes or structures. The upper and lower plates are held in alignment vertically by means of telescoping die parts 13 & 14 in conventional fashion in the art.

Figure 4:
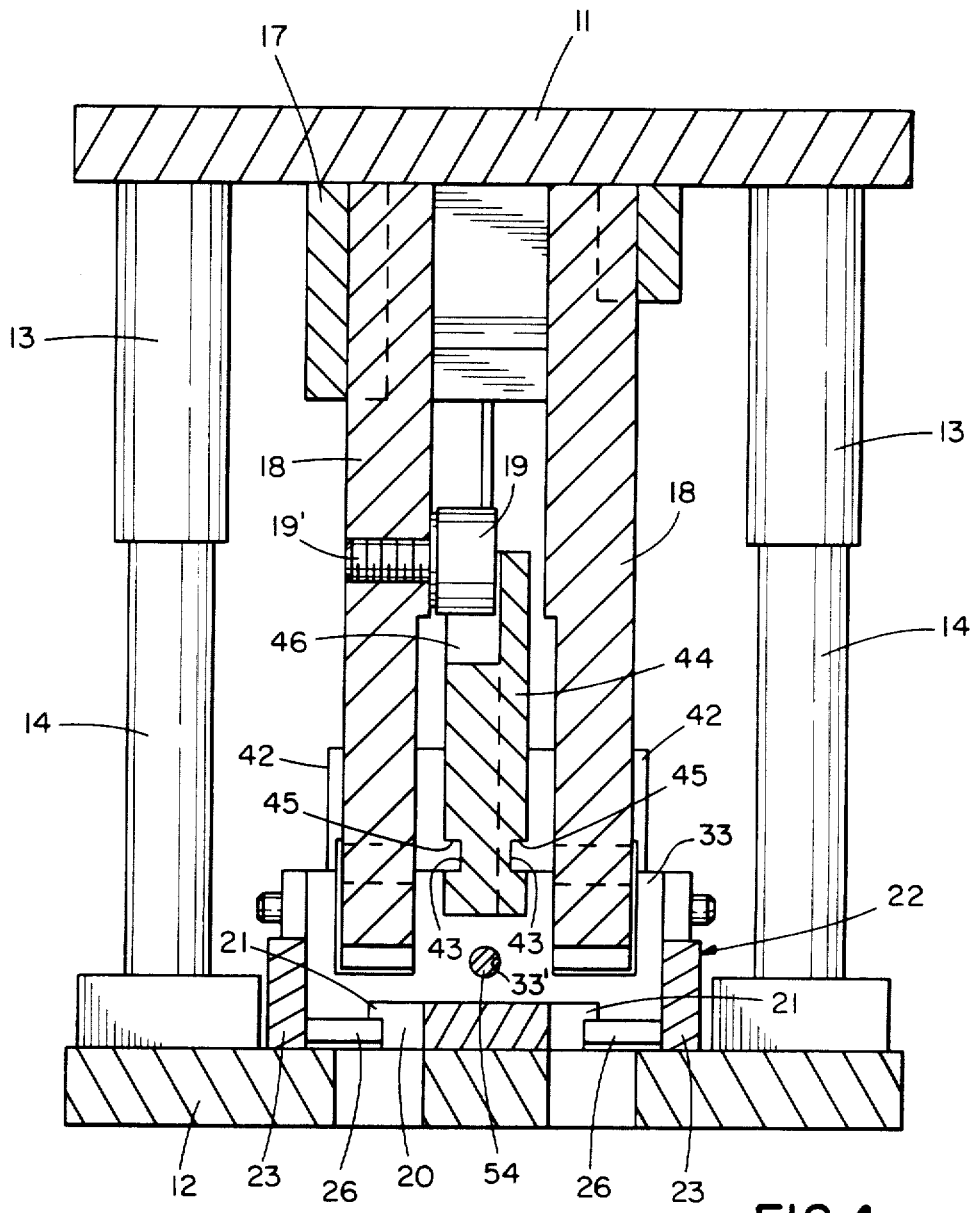
FIG. 4 is a cross sectional view through the cut-off die taken along the line 4—4 of FIG. 1.
Figure 5:
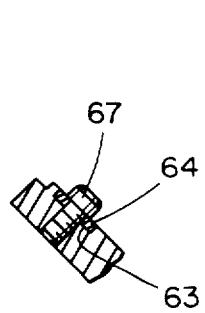
FIG. 5 is a cross sectional view of the blade holder and blade taken along the line 5—5 of FIG. 1.

A vertical cut-off blade 15 is supported in a blade holder 16 from the plate 13. A cam holder 17 is suspended from the plate 11 as best shown in FIG. 4, and supports downwardly projecting vertical locking cams 18 spaced transversely relative to the apparatus. One of the locking cams 18 also has supported therein a rotatable bearing or roller 19, the same being rotatably fixed to a shaft 19' threaded into one of the cams 18.

The lower plate 12 is provided with a guide or T-shaped rail 20 extending substantially the length of the lower plate 12. The rail 20 has overhanging projections 21. A retaining carriage 22 of rectangular configuration includes side rails 23, connected at the rear to an end rail or transverse block 24 by means of fasteners 25.

Figure 2:
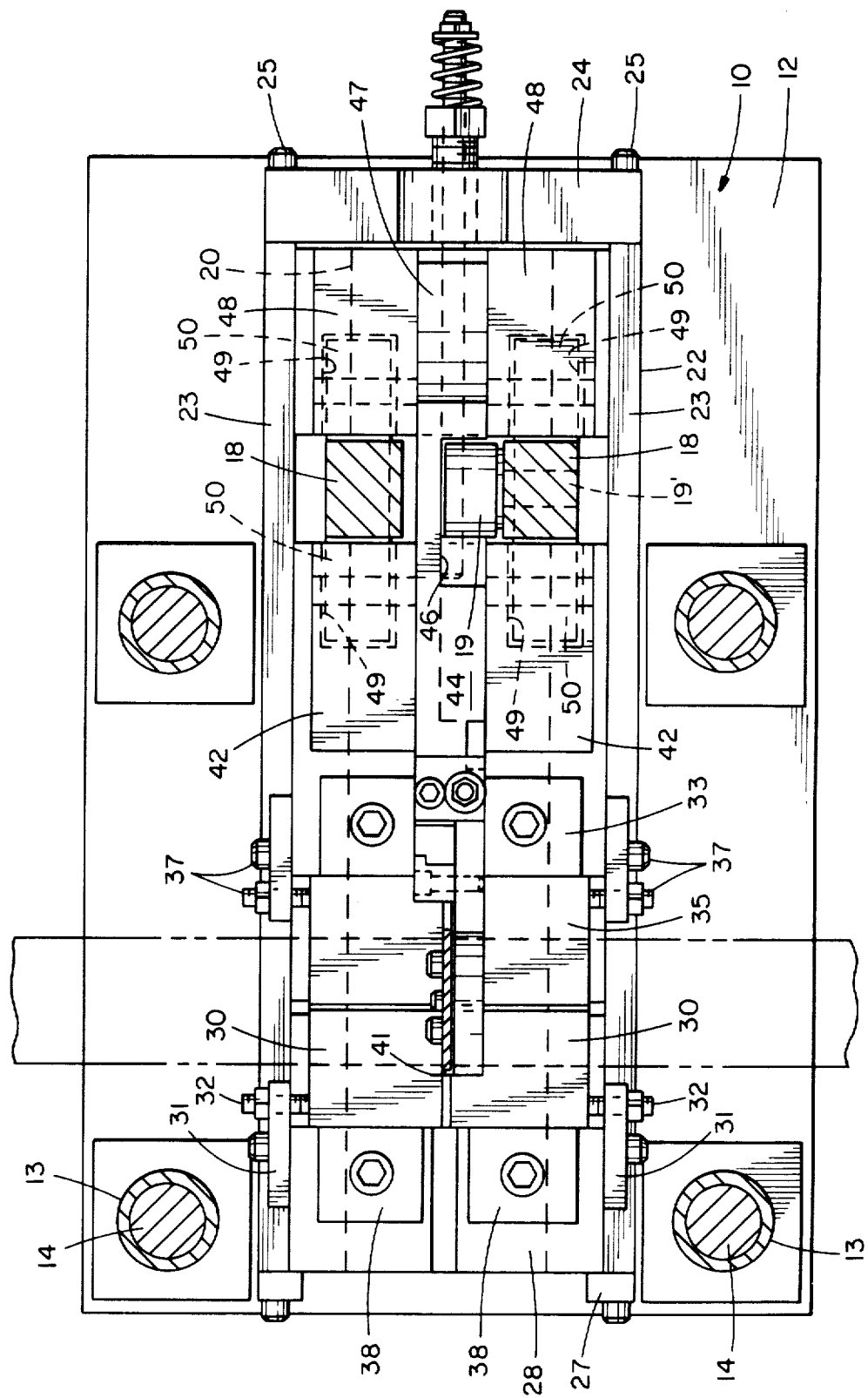
FIG. 2 is a plan sectional view through the cut-off apparatus taken substantially along the line 2—2 of FIG. 1.
Figure 3:
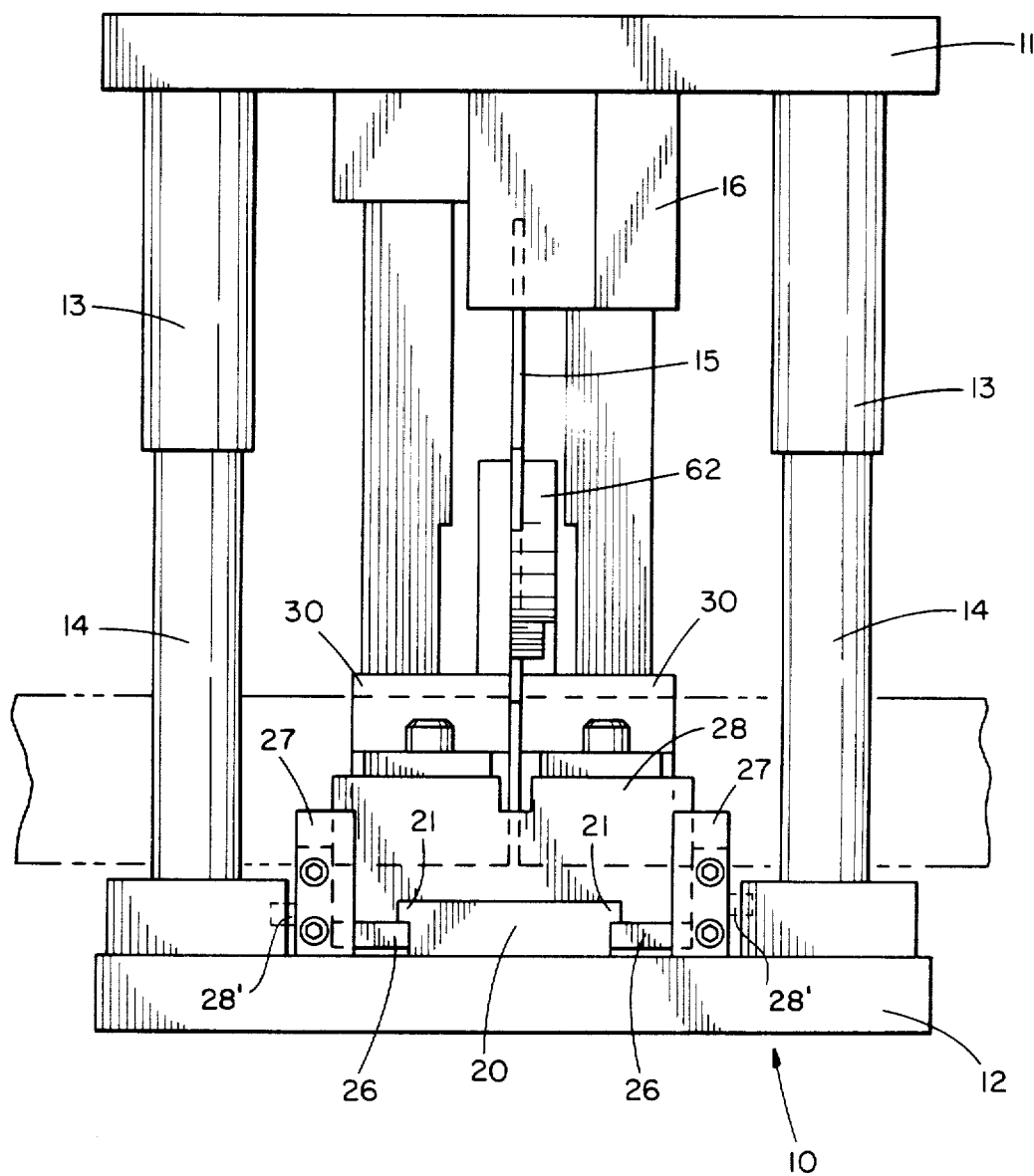
FIG. 3 is an end elevational view taken along the line 3—3 of FIG. 1.

As best shown in FIGS. 3 & 4, transversely extending retaining members or connecting ears 26 are suitably secured to a first slide block 28 by securing means such as bolts (not shown). The connecting ears 26, as best shown in FIG. 3 project inwardly underneath the overhanging projections 21 of the T-rail 20 so as to permit sliding of the block 28 with the frame 22 but the block 28 is restrained against vertical movement, since the T-rail is firmly secured to the lower plate 12. As best shown in FIGS. 2 and 3 vertical brackets 27 are connected to the ends of the rails 23. A first die slide block 28 is supported on the T-rail 20, having its lower surfaces suitably apertured to conform to the raised guide rail and thereby slide thereon. The block 28 includes a cut out portion 29 which supports a pair of jaws 30 positioned in laterally spaced relation. Brackets 31 and fasteners 32 retain the jaws 30 in the cut out portions 29 of the block 28.

A second die slide block 33 also suitably apertured on its lower surface to slide on the T-guide rail 20 is adjacent to the first block 28 and slightly spaced therefrom longitudinally. The relationship of the slide blocks 33 and 28 is well disclosed in the schematic view FIG. 10. The slide block 28 is secured for movement with the frame 23 by means of bolts 28' which extend through the side rails 23 and are threaded into the ends of slide block 28, as indicated at 28". The second slide block 33 is also apertured as indicated at 34 to provide a seat for adjacent jaws 35 held in position by brackets 36 and fasteners 37. Top brackets 38 and 39 engage recesses 40 to assist in retaining the jaws 30 and 35 in position. The jaws 30 and 35 as best shown in FIG. 1 are longitudinally spaced in their open position and are laterally spaced, as shown in FIG. 2 to provide openings 41 through which the blades 15 and 64 function. The first and second slide blocks 28 and 33 are undercut as previously described to conform to the T-rail and this is best disclosed in FIG. 3 as an example.

The rearmost portions of the second or rear slide block 33 support in laterally spaced relation horizontal side caps or blocks 42 as best shown in FIG. 4 which include horizontal inwardly projecting guide ledges 43. A horizontal slide 44 includes longitudinal recesses 45 which mate in sliding relation with the guide ledges 43 and support the slide 44 for longitudinal movement on the structure. The slide 44 is provided with a recess track or cam surface 46 which is engaged by the roller bearing cam 19 on the ascending or movement of the cams 18 and 19. Thus this cam movement causes the slide to reciprocate and achieve its function.

A bearing housing 47 is best shown in FIG. 1 and extends transversely across the T-rail 20 again being suitably apertured on its bottom surface so as to be fixed against lateral movement. Side caps or blocks 48 are securely connected to the bearing housing 47. The caps 42 and 48 include recesses 49 which accommodate support therein upper portions of rollers 50 adapted to be engaged by the cam surfaces 51 and 52 as best shown in FIG. 1. The front rollers or roller cams 50 are supported on shafts 72 carried within recesses 73 of the rear slide blocks 33, as best shown in FIG. 1. The rear rollers and bearing housing 47 are reaction members or means for the vertical cams 18. The rear rollers 50 are also supported on shafts 72 within recesses 75 of the bearing housing 47. The bearing housing 47, as best shown in FIG. 4 also has connected thereto by suitable bolts (not shown) connecting ears 26 which secure the bearing housing 47 for sliding movement on the T-rail 21.

The transverse connector block 24 of the carriage 22 has supported thereon a spring tension mechanism or resilient means 53 which comprises a threaded rod or connector means 54 which is supported on the bearing housing 47 in a bore 47' and projects through a threaded holder 56 supported in a bore 55 in block 24. A threaded tubular holder 56 is threaded into the bore 55 and is longitudinally adjustable therein. The rear end of the rod 54 includes a captive spring 59 held captive by means of a head 57 on the holder 56 and a washer and nut 58 on the end of the rod 54. The rod 54 is threaded into the second or rear slide block 33 as indicated in FIG. 1. This mechanism brings about tension movement tending to pull the slide block 33 back to the position shown in FIG. 1, from a position when the jaws are almost closed in the clamping position.

The spring tension mechanism 53 is adjustable by rotating the nut 58 which increases or decreases the force on the clamping of the clamping blocks 28 and 33. In other words the rotation of this nut controls, or increases and decreases the unclamping force.

The clamping pressure on the die clamping blocks is tightened or loosened by rotating the nut 57. As best shown in FIGS. 1 and 4 the threaded rod 54 is contained within a bore 33' in the block 33.

Figure 6:
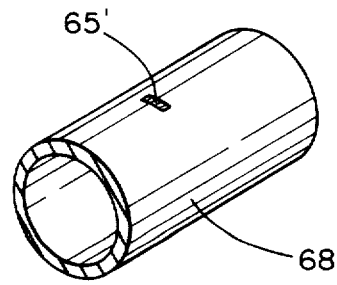
FIG. 6 is a perspective view disclosing a notch cut in the upper edge of a tube by a horizontal tube scarfing plate.
Figure 8:
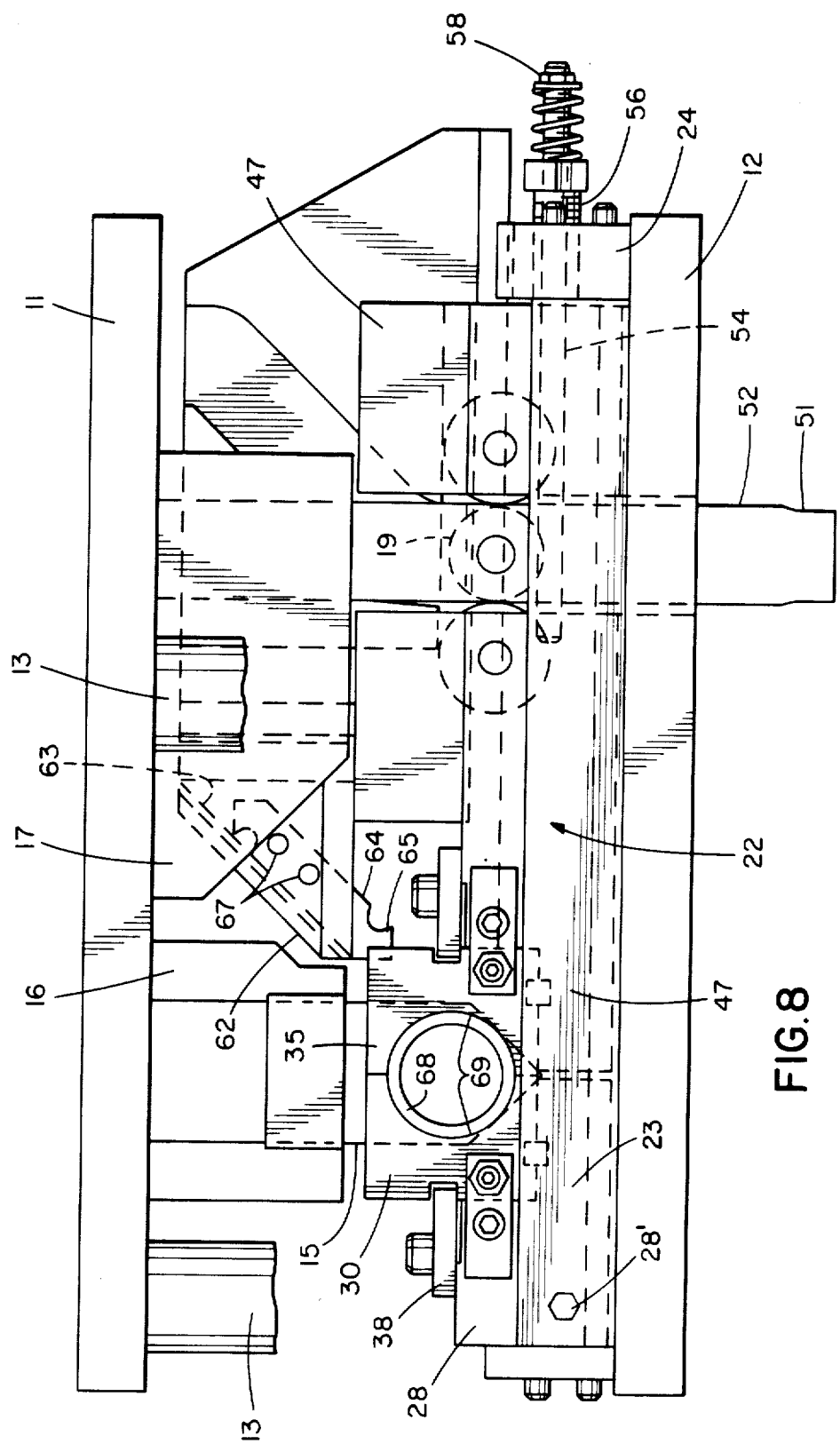
FIG. 8 is a side elevational view similar to FIG. 1, disclosing the apparatus in a closed position.

As best shown in FIG. 1 a scarfing blade holder block 60 is removably connected to the slide 44 by securing screws 61, the holder block 60 extending longitudinally and diagonally. The block 60 includes a nose portion 62 having a scarfing blade retainer slot 63 supporting a scarfing blade 64. The scarfing blade 64 includes at opposite ends thereof scarfing blade portions 65 which during operation open up the top chord slot 65' as shown in the tube in FIG. 6 at 68. Thus each blade may be used twice by simply reversing the blade position by removal and replacement of the screws 67 which contain the blade in the retainer slot 63 of the nose portion 62. FIG. 8 discloses the Tube 68 clamped in the jaws 69.

Figure 7:
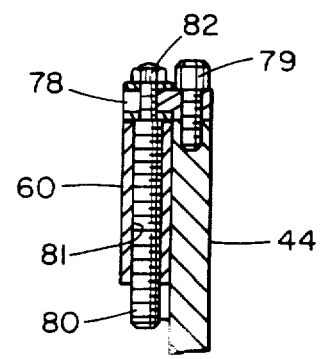
FIG. 7 is a cross sectional view of a scarfing blade height adjustment taken substantially along the line 7—7 of FIG. 1.

FIGS. 7 and 9 disclose the vertical adjustment of the scarfing blade 64 which may be moved vertically for adjustment relative to the tube. Initially the screws 61 are loosened permitting loosening of the clamping lug 61; see FIG. 9. The holder block 81 may now be raised or lowered by turning the screw head 82 which turns the threaded member 80 which is in the threaded bore 81. Thus the scarfing blade can be vertically adjusted as desired.

FIG. 7 discloses an adjusting mechanism for the holder block 60 containing the scarfing blade 64. The holder 60 is supported for vertical movement relative to the horizontal slide 44 by means of a support member 78 connected to the slide 44 by means of a screw 79. A vertical adjusting screw 80 is threaded into a threaded bore 81 and upon rotation of the head 82 the screw 80 rotates moving the block 60 vertically and thereby adjusting the scarfing blade relative to the tube to be scarfed.

THE OPERATION

The cut-off apparatus disclosed as the invention may be utilized in any suitable mechanical press which will move the die shoes or plates together and return them to their original position. Because of the compactness of the present unit it is also ideally suited for smaller four post presses, open gap presses and flying cut-off presses of the type associated with tube producing mills. It also can be ideally used with open gap presses where a relatively short distance is provided between the ram centerline to the rear open face of the press.

The apparatus disclosed thus is versatile and since the clamping cams and horizontal blade are all actuated from the same side allowing a very limited distance from the tube centerline to one die edge, the unit will fit into very small presses, such as the C-Frame type of press.

In operation the tube 66 is inserted through the opening 69 in the jaws as indicated in FIG. 1. The upper plate 11 now moves in the direction of the lower plate 12.

The cams 18 are moved downwardly and as the cam surfaces 51 move downwardly the roller cams 50 rotate unto the cam surface 52 which causes movement of the second slide block 33 to the left and movement of the frame and retaining carriage 23 slightly to the right. This movement closes the jaws tightly clamping the tube. The roller cam 19 simultaneously enters into recessed cam track 45' which causes movement of the slide 44 to the right in FIG. 1, and the blade holder block 60 is simultaneously moved whereupon the scarfing blade 64 cuts the upper surface of the tube leaving the recess 65. The scarfing blade, holder 60 and slide 44 move to the right and the cut-off blade 15 now servers the tube by entering the recess 65 and cutting through the tube leaving no dimple. The spring tension mechanism 58 now functions to open up the die blocks and jaws again to the position shown in FIG. 1 with the cams 18 returning to the position indicated and the apparatus is now ready for the next cut.

The vertical cams and cam rollers serve the dual function of moving the blocks 28 and 33 and also actuating the slide which provides a positive and coordinated operation. Major operating parts such as the slide blocks and rear block all ride on the T-rail which provides a failure proof operating assembly 22. Further the horizontal blade holder 60 may be adjusted vertically by the utilization of a suitable gauge inserted between the lower surface of the scarfing blade holder 60 and the upper surface of the tube gripping jaws 35 to the various depth positions desired by the operator for a particular tube wall thickness. It is also a feature of the invention that the pull type of horizontal blade and holder reduces the stroke size requirement over other cut-off apparatus. A further advantage by the present combination is that size and weight are greatly reduced which is highly desired where the apparatus is used in flying cut-off presses.

The important advantages of the present design lie in the present arrangement of a platen with a T-shaped supporting rail on which the die blocks with jaws are mounted for horizontal movement. Fore and aft movement of the assembly is restrained by the floating frame to which the slide block 28 is connected. The rectangular containing frame provides for the movement in concert of the movable members in their clamping function, held freely in the sliding position by the vertical cam member. The cam member, the slide, the scarfing blade are in substantial in line, i.e. in longitudinal alignment so that side thrust forces are eliminated and effective operation is maintained.

The foregoing disclosure of specific embodiments is illustrative of the broad inventive concepts comprehended by the invention.

What is claimed is:

1. A tube cut-off apparatus comprising an upper plate and a lower plate positioned in vertical alignment and for relative vertical reciprocation, a tube cut-off blade on said upper plate,
   a first cam means on said upper plate projecting downwardly toward said lower plate,
   a guide member on said lower plate extending longitudinally thereof,
   first and second longitudinally spaced die block supports carried on said guide member for relative longitudinal movement,
   said die block supports having adjacent ends in relatively spaced relation,
   a pair of cut-off jaws forming a gripping opening, supported on said adjacent ends, and being adapted to clamp and support a tube to be cut during movement of said jaws in closing relation,
   said jaws having a recess for receiving said cut-off blade to cut a tube supported within said jaws,
   a jaw operating cam structure operatively connected to one of the die block supports and engaged by said first cam means for moving relatively said die block supports together and clamping said cut-off jaws together responsive to downward motion of said first cam means,
   a slide member supported for reciprocal horizontal movement on said lower plate relative to said lower plate,
   said slide member having a first slide operating cam means,
   a cutting blade on said slide member adapted to move horizontally in said recess with said slide member relative to said lower plate,
   a second slide operating cam means operatively associated with said first cam means and operative thereby and engaging said first slide operating cam means to move said slide member thereby cutting an opening in a tube to be cut supported in said jaws prior to movement of said cut-off blade through said recess and said jaws.

2. Apparatus in accordance with claim 1, said guide member on said lower plate comprising an upwardly extending projection extending substantially the length of said lower plate.

3. The apparatus in accordance with claim 2, said guide member having a T-shaped configuration in cross section.

4. The apparatus in accordance with claim 1, and retaining means supported on said lower plate and operatively associated with the die block supports for sliding movement relative to said guide member and accomodating limited longitudinal movement of said die block supports and jaws.

5. The invention according to claim 4 and
said retaining means comprising a frame including horizontally spaced interconnected side and end rails.

6. The invention according to claim 4 and
said first cam means and second slide operating cam means being positioned to one lateral side of said cut-off blade.

7. Apparatus in accordance with claim 4, including a spring element connected to said retaining means and said die block supports.

8. Apparatus in accordance with claim 1, said first slide operating cam means comprising a diagonally extending cam surface,
said second slide operating cam means comprising a rotatable cam engaging said first slide operating cam means in camming relation.

9. Apparatus in accordance with claim 1, said first cam means and second slide operating cam means being positioned to one lateral side of said cut-off blade.

10. Apparatus in accordance with claim 4, said guide member having an interlocking configuration in cross section coupling with the die block supports.

11. Apparatus in accordance with claim 1, said first cam means including laterally spaced vertically extending cam surfaces, adapted to engage said die block supports to move the same longitudinally and thereby close the jaws supporting said tube.

12. Apparatus in accordance with claim 1, said one of said die block supports slidably supporting said slide member for reciprocal movement toward and away from said jaws.

13. Apparatus in accordance with claim 10, said die block supports including longitudinally extending grooves in the lower surface thereof conforming generally to the shape of said guide member and nesting therewith.

14. Apparatus in accordance with claim 1, including adjustable spring means associated with said die block supports to move said die block supports from closed to open position.

15. Apparatus in accordance with claim 1, including a support member for said cutting blade, said support member being adjustably connected to said slide member, and adjusting means associated with said support member and slide member whereby said cutting blade may be adjusted vertically relative to a tube clamped within said jaws attendant to maintaining the structural support of the cutting blade relative to said slide member.

16. The invention according to claim 1 and
said first cam means being substantially vertical and carrying said second slide operating cam means, and said second slide operating cam means engaging the first slide operating cam means for reciprocating said slide whereby said scarfing blade is reciprocated and cuts a recess in said tube.

17. Apparatus in accordance with claim 16 said first vertical cam means, one of said die block supports, and cammed slide member all being positioned to one lateral side of said jaws.

18. Apparatus in accordance with claim 16 said first vertical cam means actuating one of said die block supports and said slide member sequence.

19. Apparatus in accordance with claim 17, said cutting blade on said cammed slide member initially being positioned on opposite lateral side of said of said jaws and during scarfing movement, moving to the same side as said slide member and first cam means.

20. Apparatus in accordance with claim 19, and said lower plate including an upwardly projecting guide rail, retaining means slidingly supporting said jaws, and die block supports on said guide rail.

21. Apparatus in accordance with claim 20 and said retaining means including frame means connecting said jaws, die block supports and cammed slide member.

22. Apparatus in accordance with claim 21 said frame means being slideable on said lower plate.

23. Apparatus in accordance with claim 16, said vertical cutting blade,
said second slide operating cam means
said cammed slide member, and
said cutting blade, all being substantially in vertical plane alignment thereby reducing twisting action and resultant friction on the second slide operating cam means, the slide member, and the cutting blade.

24. Apparatus for severing tubing comprising upper and lower die support members positioned for relative vertical reciprocation,
a vertical cutting blade on said upper die support member,
a vertical cam means on said upper die support member laterally spaced relative to said vertical cutting blade,
tube gripping jaw means on said lower die support member for movement between open and tube griping positions,
said jaw means having an opening for receiving said vertical cutting blade to cut a tube supported within jaws,
a horizontally moveable slide supported on said lower die support means,
said slide including a notching blade adapted during reciprocation to move through said jaw opening to initially cut a notch in the top wall of a tube secured within said jaws means,
said vertical cam means during movement of said upper die support member providing for clamping movement of said jaws,
and second cam means associated with said vertical cam means for reciprocating said slide,
said vertical cam means and second cam means being positioned in laterally spaced relation to one side of said vertical cutting blade,
and said second cam means engaging said slide for moving said slide horizontally responsive to movement of said upper die support member, thereby cutting a notch in the top wall of a tube to be cut by said vertical blade, and said slide including a support member carrying the notching blade and including adjusting means operatively associated with and supporting said support member while adjusting same relative to said jaw means for varying the position of an associated tube clamped by the jaw means.

25. The invention according to claim 24 and said ajdusting means comprising a screw means changing elevation of said notching blade relation to said slide responsive to axial rotation of said screw means.

26. The invention according to claim 24 and said support member having a downward facing feeler engagement surface and, said jaw means having an upward facing feeler engagement surface, defining a gap between said surfaces, the gap being adapted to receive a gauge therebetween to measure the gap as determined by the adjusting means.

27. A tube cut-off apparatus having upper and lower die plates, a tube cut-off blade on said upper plate and extending downwardly from said upper plate, clamping jaws on the lower plate clamping and supporting a tube to be cut responsive to relative movement of said upper and lower die plates, a scarfing structure on the lower plate for cutting a notch in the wall surface of a tube to be cut, said scarfing structure comprising:

a slide member supported by said lower die plate, a scarfing blade being carried by the slide member and incremental adjustment means including means connecting said scarfing blade to said slide member and means vertically supporting said scarfing blade and raising and lowering said scarfing blade relative to said slide member while maintaining support of said scarfing blade relative to said slide member in the adjusting of scarfing blade relative to the slide member.

28. The invention according to claim 27 and said incremental adjustment means comprising a screw means changing elevation of said scarfing blade relative to said slide member responsive to axial rotation of said screw means.

29. In a tube cut-off apparatus being provided with upper and lower die plates, and a tube cut-off means extending from the upper die plate, and a tube clamping assembly being mounted on said lower die plate and the upper die plate having a downward extending cam means for actuating the tube clamping assembly, the tube clamping assembly comprising:

a jaw supporting guide member for said lower die plate, a first jaw structure carried on said guide member, a second jaw structure carried on said guide member and opposing said first jaw structure for clamping and supporting a tube to be cut, said first and second jaw structures having first and second engaging means respectively, said first and second engaging means engaging the guide member and supporting said first and second jaw structure for movement thereon, a retaining means being operatively associated with and entrapping each jaw structure, a reaction member carried on said guide member and operatively associated with and engaging with said retaining means, the reaction member and the second jaw structure being adapted to be moved apart responsive to movement of the associated cam means, thereby moving the first and second jaw structures together, and resilient means being interposed between said second jaw structure and said retaining means and providing a resilient suspension of the second jaw structure, and whereby the force of the resilient means draws the first and second jaw structures adjusting means engagingly interposed between said reaction member and said retaining means, said adjusting means adjusting the position of said reaction member relative to said retaining means, thereby adjusting the distance between said first and second jaw structures.

30. The invention according to claim 29 and said resilient means being in compression when said second jaw structure and said reaction member are moved apart.

31. The invention according to claim 30 and said resilient means including a connector extending through said reaction member and coupling with said second jaw structure.

32. The invention according to claim 29 and said resilient means including a connector coupling with the second jaw structure and a spring means interposed between the retaining means and the connector for suspension of the second jaw structure.

33. The invention according to claim 30 and the retaining means comprising a pair of side members connected to the first jaw structure and an end member connected to the side members and engaging the reaction member for causing the first jaw structure to move in concert therewith.

* * * * *

UNITED STATES PATENT OFFICE
CERTIFICATE OF CORRECTION

PATENT NO. : 4,563,927
DATED : January 14, 1986
INVENTOR(S) : Robert J. Kinsley

It is certified that error appears in the above-identified patent and that said Letters Patent are hereby corrected as shown below:

Column 10, line 26, before "adjusting", please insert --apart; and--.

Signed and Sealed this

Eleventh Day of November, 1986

Attest:

DONALD J. QUIGG

Attesting Officer

Commissioner of Patents and Trademarks